US011214649B2

(12) United States Patent
Hollmann et al.

(10) Patent No.: US 11,214,649 B2
(45) Date of Patent: Jan. 4, 2022

(54) REACTIVE THERMOPLASTIC POLYURETHANE BASED ON BLOCKED ISOCYANATES

(71) Applicant: BASF SE, Ludwigshafen am Rhein (DE)

(72) Inventors: Rajan Hollmann, Lemfoerde (DE); Sebastian Richter, Lemfoerde (DE); Martin Hufnagel, Lemfoerde (DE); Hendrik Wagner, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 197 days.

(21) Appl. No.: 16/482,951

(22) PCT Filed: Feb. 16, 2018

(86) PCT No.: PCT/EP2018/053910
§ 371 (c)(1),
(2) Date: Aug. 1, 2019

(87) PCT Pub. No.: WO2018/149977
PCT Pub. Date: Aug. 23, 2018

(65) Prior Publication Data
US 2020/0010607 A1 Jan. 9, 2020

(30) Foreign Application Priority Data

Feb. 17, 2017 (EP) ..................... 17156655

(51) Int. Cl.
*B33Y 70/00* (2020.01)
*C08G 18/80* (2006.01)
(Continued)

(52) U.S. Cl.
CPC .......... *C08G 18/8077* (2013.01); *B33Y 70/00* (2014.12); *C08G 18/12* (2013.01);
(Continued)

(58) Field of Classification Search
CPC .... B33Y 70/00; C08G 18/8077; C08G 18/12; C08G 18/2855; C08G 18/3206;
(Continued)

(56) References Cited

U.S. PATENT DOCUMENTS 3,933,759 A * 1/1976 Hoeschele ......... C08G 18/0871
528/45
4,153,775 A 5/1979 Winkelmann et al.
(Continued)

FOREIGN PATENT DOCUMENTS

CA 2166306 A1 1/1995
DE 27 07 659 A1 8/1978
(Continued)

OTHER PUBLICATIONS

International Search Report dated May 15, 2018 in PCT/EP2018/053910, 2 pages.
(Continued)

*Primary Examiner* — Michael L Leonard
(74) *Attorney, Agent, or Firm* — Grüneberg and Myers PLLC

(57) ABSTRACT

A method for producing a shaped body, containing: producing the shaped body from a composition by a powder-based layer construction process, wherein the composition contains a thermoplastic polyurethane, obtained by reacting a polyisocyanate composition and a polyol composition, the thermoplastic polyurethane is solid at least in a temperature region below 50° C. and has end groups selected from the group consisting of first end groups and second end groups, wherein the first end groups are optionally eliminated at a first temperature, and the second end groups are optionally eliminated at a second temperature, to form reactive groups on the thermoplastic polyurethane that optionally enter into a reaction with functional groups of the thermoplastic poly- (Continued)

urethane or functional groups of a further component of the composition, and wherein the first temperature and the second temperature are each greater than or equal to 60° C.

12 Claims, 6 Drawing Sheets

(51) Int. Cl.
*C08G 18/12* (2006.01)
*C08G 18/28* (2006.01)
*C08G 18/32* (2006.01)
*C08G 18/48* (2006.01)
*C08G 18/72* (2006.01)
*C08G 18/76* (2006.01)

(52) U.S. Cl.
CPC ..... *C08G 18/2855* (2013.01); *C08G 18/3206* (2013.01); *C08G 18/4854* (2013.01); *C08G 18/721* (2013.01); *C08G 18/7671* (2013.01); *C08G 18/8074* (2013.01); *C08G 2140/00* (2013.01)

(58) Field of Classification Search
CPC ............... C08G 18/4854; C08G 18/721; C08G 18/7671; C08G 18/8074; C08G 18/6681; C08G 2140/00
See application file for complete search history.

(56) References Cited

U.S. PATENT DOCUMENTS

| | | | |
|---|---|---|---|
| 4,403,084 A | 9/1983 | McGary, Jr. et al. | |
| 4,434,126 A | 2/1984 | McGary, Jr. et al. | |
| 4,940,750 A * | 7/1990 | Rosthauser | C08G 18/0871 524/871 |
| 9,453,142 B2 | 9/2016 | Rolland et al. | |
| 2015/0152214 A1 * | 6/2015 | Uenlue | C08K 3/015 523/122 |
| 2016/0034465 A1 | 2/2016 | Sinha et al. | |
| 2016/0136889 A1 * | 5/2016 | Rolland | B29D 11/00009 264/1.27 |
| 2017/0129177 A1 | 5/2017 | Hättig et al. | |
| 2017/0173872 A1 * | 6/2017 | McCall | B33Y 10/00 |
| 2018/0148624 A1 | 5/2018 | Kierat | |
| 2019/0322794 A1 | 10/2019 | Richter | |
| 2019/0337222 A1 * | 11/2019 | Gu | C08G 18/10 |

FOREIGN PATENT DOCUMENTS

| | | |
|---|---|---|
| EP | 0 089 180 A2 | 9/1993 |
| WO | WO 95/01407 A1 | 1/1995 |
| WO | WO-2015109143 A1 * | 7/2015 ............ C08L 75/06 |
| WO | WO 2015/197515 A1 | 12/2015 |

OTHER PUBLICATIONS

Subramani, S. et al. "New development of polyurethane dispersion derived from blocked aromatic diisocyanate" Progress in Organic Coatings, vol. 48, No. 1, XP055392080, 2003, pp. 71-79.
Saunders, J.H. et al. "Polyurethanes Chemistry and Technology Part 1. Chemistry" Interscience Publishers, 1962, 7 pages.
Tang, Y-F. et al. "Study on Blocking and Deblocking Kinetics of Diisocyanate with ε-Caprolactam Using FTIR Spectroscopy" Asian Journal of Chemistry, vol. 25, No. 10, 2013, pp. 5703-5706.
"Rohstoffe" Polyurethane Plastics Handbook, vol. 7, 1993, 19 pages.
"Zusatztoffe" Polyurethane Plastics Handbook, vol. 7, 1966, 27 pages.
"Protection for the Hydroxyl Group, Including 1,2-AND 1,3-DIOLS" Protective Groups in Organic Synthesis, 3$^{rd}$ Edition, 1999, 229 pages.
U.S. Appl. No. 16/349,798, filed May 14, 2019, Zeljko Tomovic.
U.S. Appl. No. 16/478,588, filed Jul. 17, 2019, Frank Thielbeer.

* cited by examiner

REACTIVE THERMOPLASTIC POLYURETHANE BASED ON BLOCKED ISOCYANATES

The present invention relates to a composition (Z1) comprising a thermoplastic polyurethane (TPU1) which is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1), wherein the temperature (T1) and the temperature (T2) are each greater than or equal to 60° C. The present invention also relates to a process for preparing a composition (Z1) comprising a thermoplastic polyurethane, and to the composition comprising the thermoplastic polyurethane obtainable or obtained by a process of this kind. The present invention further relates to the use of a composition according to the invention or of a thermoplastic polyurethane according to the invention for the production of a shaped body and also to a process for producing a shaped body and to the shaped body obtained.

Thermoplastic polyurethanes for various applications are known in principle from the prior art. By the variation in the feedstocks, it is possible to obtain different profiles of properties.

In order to be able to produce components of a very wide variety of geometries, thermoplastic polyurethanes are processed not only by processes such as extrusion or injection molding but also in layer construction processes, for example powder-based layer construction processes.

Processes known from the prior art involve a compromise between good processing and mechanical properties. The use of TPUs having low molecular weights enables good processing of the material due to the lower melt viscosities thereof, but these have the drawback of poorer mechanical properties. The use of high-performance TPUs having correspondingly high molecular weights hinders and slows the laser sintering process considerably.

WO 2015/197515 A1 thus discloses the use of thermoplastic polyurethane powders in powder-based additive manufacturing processes for producing thermoplastic articles. Additive manufacturing processes refer to those processes with which articles are built up in layers.

U.S. Pat. No. 9,453,142 relates to polymerizable liquids or resins that are employed for the production of a three-dimensional object from polyurethane, polyurea or a copolymer. In this case, the resin comprises a blocked or reactively blocked prepolymer, a blocked or reactively blocked diisocyanate, or a blocked or reactively blocked diisocyanate chain extender.

EP 0 089 180 A1 discloses a crystalline, grindable and end-blocked prepolymer which is suitable for use in the preparation of a polyurethane elastomer and is composed of the reaction product of a reaction of an organic polyisocyanate, a crystalline, long-chain diol with an average molecular weight of 500 to 5000, a polyhydroxy crosslinking agent and an end-blocking agent.

U.S. Pat. No. 4,434,126 discloses processes for producing flexible polyurethane films. This involves employing finely disperse particles of a polyurethane prepolymer which comprises the reaction product of an organic polyisocyanate, a crystalline long-chain diol having an average molar mass of 500 to 5000, a polyhydroxy crosslinking agent and an end-blocking agent. The resulting polyurethane elastomers have a 100% modulus of less than 17.58 $kg/cm^2$ (250 psi) and a 300% modulus in the range from 14.06 to 35.15 $kg/cm^2$ (200 to 500 psi).

The processes known from the prior art all represent a compromise between processability of the materials and mechanical properties of the products obtained.

Proceeding from the prior art, one object of the present invention was accordingly that of providing improved materials that can be readily processed and enable the production of products having good mechanical properties.

According to the invention, this object is achieved by a composition (Z1) comprising a thermoplastic polyurethane (TPU1), obtainable or obtained by reacting at least components (i) and (ii):

(i) at least one polyisocyanate composition,
(ii) at least one polyol composition, wherein the thermoplastic polyurethane (TPU1) is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1), wherein the temperature (T1) and the temperature (T2) are each greater than or equal to 60° C.

The compositions according to the invention allow the combination of a low molecular weight and accordingly a low melt viscosity during processing with a higher molecular weight in the finished component. It has been found that, surprisingly, by the introduction of thermally labile groups (EG1) and/or (EG2), it is possible to obtain solid thermoplastic polyurethanes which can be processed further in powder form and have not yet fully reacted in the initial state. It has been found that it is possible in accordance with the invention to obtain powders which can coalesce particularly readily when melted, for example by a laser, and that the air present between the powder grains can outgas better out of the melt. They can be processed readily as a result of the accordingly low molecular weight and corresponding melt viscosity. During further processing, especially in a melting operation, the thermally labile end groups are eliminated and as a result reactive groups, for example isocyanate groups or hydroxyl groups, are formed on the thermoplastic polyurethane, which then react further and thus lead to a further increase in molecular weight. The shaped bodies obtained according to the invention accordingly feature improved mechanical properties.

The composition (Z1) according to the invention comprises a thermoplastic polyurethane (TPU1) and may comprise further components, for example incompletely converted compounds that were employed in the preparation of the thermoplastic polyurethane. According to the invention, the composition (Z1) is likewise solid, preferably solid at least in the temperature region below 50° C.

The thermoplastic polyurethane (TPU1) is obtainable or obtained by reacting at least one polyisocyanate composition and at least one polyol composition and is solid at least in the temperature region below 50° C. The thermoplastic polyurethane (TPU1) within the context of the present invention is preferably solid at least in the temperature region below 60° C., more preferably solid at least in the temperature region below 80° C.; the thermoplastic polyurethane (TPU1) is particularly preferably solid at least in the temperature region below 100° C.

Within the context of the present invention, the thermoplastic polyurethane (TPU1) has end groups selected from the group consisting of end groups (EG1) and end groups (EG2), which at a temperature (T1) and (T2), respectively, can be eliminated to form reactive groups on the thermoplastic polyurethane (TPU1) that can enter into a reaction with functional groups of the thermoplastic polyurethane (TPU1) or a further component of the composition (Z1), wherein the temperature (T1) and the temperature (T2) are each greater than or equal to 60° C. According to the invention, the thermoplastic polyurethane (TPU1) may thus have end groups (EG1) or end groups (EG2), or end groups (EG1) and end groups (EG2).

End groups (EG1) and (EG2) can be eliminated at a temperature (T1) and (T2), respectively, to form reactive groups on the thermoplastic polyurethane (TPU1), that is to say a portion of the end group is eliminated from the thermoplastic polyurethane and a reactive group that can enter into a reaction remains on the thermoplastic polyurethane (TPU1). In this case, a reaction may in particular be a chain growth or crosslinking reaction. Reactive groups here can be in particular isocyanate groups or isocyanate-reactive groups such as in particular hydroxyl groups or amines. According to the invention, the reactive groups formed after elimination of the end groups can react with further functional groups of the thermoplastic polyurethane (TPU1) or else with functional groups of a further component of the composition (Z1), such as unreacted structural components of the thermoplastic polyurethane, for example.

It is also possible, according to the invention, for the thermoplastic polyurethane to have further end groups which can be eliminated at a suitable temperature to form reactive groups.

Suitable end groups are known per se to those skilled in the art. According to the invention, the end groups can in particular be those that are customarily employed as thermally labile protective groups.

The proportion of end groups (EG1) and/or (EG2) can vary within broad ranges. The proportion of end groups is chosen according to the invention such that further reaction of the thermoplastic polyurethane (TPU1) is readily possible after elimination of the end groups. In this case, the content of the sum total of end groups (EG1) and (EG2) can by way of example be in the range from 0.01 to 50 mol %, based on the content of urethane groups in the thermoplastic polyurethane (TPU1).

In a further embodiment, the present invention also relates to a composition as described above, wherein the content of the sum total of end groups (EG1) and (EG2) is in the range from 0.01 to 50 mol %, based on the content of urethane groups in the thermoplastic polyurethane (TPU1).

According to the invention, end groups (EG1) and end groups (EG2) employed are those which can be eliminated at a temperature (T1) and (T2), respectively, to form reactive groups on the thermoplastic polyurethane (TPU1), wherein the temperature (T1) and the temperature (T2) are each greater than or equal to 60° C. According to the invention, the end groups can therefore be eliminated, for example, during the further processing of the composition (Z1) or of the thermoplastic polyurethane (TPU1), especially when melting the thermoplastic polyurethane. Within the context of the present invention, the temperature (T1) and the temperature (T2) are each greater than or equal to 80° C., more preferably each greater than or equal to 100° C. Here, the temperature (T1) is usually not equal to the temperature (T2) within the context of the present invention. It is therefore also possible within the context of the present invention for the end groups to be eliminated at different temperatures and thus in different steps of processing the thermoplastic polyurethane (TPU1).

The thermoplastic polyurethane (TPU1) is obtainable or obtained by reacting at least one polyisocyanate composition and at least one polyol composition. According to the invention, the polyol composition comprises polyols. According to the invention, the polyol composition may also comprise chain extenders. Within the context of the present invention, chain extenders employed are compounds having at least two isocyanate-reactive groups. It is thus possible according to the invention for composition (Z1) also to comprise unreacted chain extenders as further components.

In a further embodiment, the present invention also relates to a composition as described above, wherein the polyol composition comprises at least one chain extender selected from compounds having at least two groups that are reactive toward isocyanate groups. The present invention additionally also relates in a further embodiment to a composition as described above, wherein the composition (Z1) comprises at least one chain extender selected from compounds having at least two groups that are reactive toward isocyanate groups.

Within the context of the present invention, at least a portion of the isocyanate employed has end groups (EG1) or at least one of the components of the polyol composition has end groups (EG2).

Preference is given to employing at least one chain extender selected from the group consisting of compounds having at least two isocyanate-reactive groups with a molecular weight<500 g/mol.

Compounds having at least two isocyanate-reactive groups are employed as chain extenders. Isocyanate-reactive groups may especially be NH, OH or else SH groups. Suitable compounds are known per se to those skilled in the art. Diamines or else diols are suitable, for example. Accordingly, the the present invention in a further embodiment also relates to a composition as described above, wherein the chain extender is selected from the group consisting of diamines and diols having a molecular weight of up to 500 g/mol.

The chain extender employed can, according to the invention, have two isocyanate-reactive groups and further groups, for example suitable end groups (EG2). However, it is also possible within the context of the present invention to employ chain extender mixtures comprising at least one chain extender having two isocyanate-reactive groups and at least one chain extender which has two isocyanate-reactive groups and at least one end group (EG2).

It is also possible according to the invention for the chain extender employed to have an isocyanate-reactive group and further groups, for example suitable end groups (EG2). The chain extender employed may for example have an isocyanate-reactive group and a suitable end group (EG2). It is also possible within the context of the present invention to employ chain extender mixtures comprising at least one chain extender having two isocyanate-reactive groups and at least one chain extender which has an isocyanate-reactive group and at least one end group (EG2).

In one embodiment of the present invention diols having a molecular weight of <350 g/mol are employed as further chain extender.

Preferably employable are aliphatic, araliphatic, aromatic and/or cycloaliphatic diols having a molecular weight of 50 g/mol to 220 g/mol. Preference is given to alkanediols having 2 to 12 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol and hexane-1,6-diol.

Also suitable as chain extenders within the context of the present invention are branched compounds such as 1,4-cyclohexanedimethanol, 2-butyl-2-ethylpropanediol, neopentyl glycol, 2,2,4-trimethylpentane-1,3-diol, pinacol, 2-ethylhexane-1,3-diol, cyclohexane-1,4-diol or N-phenyldiethanolamine. Compounds having OH and NH groups are likewise suitable, such as 4-aminobutanol, for example.

Mixtures of two or more chain extenders may also be employed according to the invention.

Within the context of the present invention, the amount employed of the chain extender and of the polyol composition may vary within broad ranges. For example, within the context of the present invention, the chain extender may be employed in an amount in the range from 1:40 to 10:1, based on the polyol employed.

According to the invention, the polyol composition comprises at least one polyol. Polyols are known in principle to those skilled in the art and described for example in "Kunststoffhandbuch" [Plastics Handbook], volume 7, "Polyurethane" [Polyurethanes], Carl Hanser Verlag, 3rd edition, 1993, chapter 3.1. Particularly preferably employed as polyols are polyesterols or polyetherols. Polycarbonates may likewise be employed. Copolymers may also be used in the context of the present invention. The number-average molecular weight of the polyols used according to the invention is preferably between $0.5 \times 10^3$ g/mol and $8 \times 10^3$ g/mol, preferably between $0.6 \times 10^3$ g/mol and $5 \times 10^3$ g/mol, in particular between $0.8 \times 10^3$ g/mol and $3 \times 10^3$ g/mol.

Polyetherols, but also polyesterols, block copolymers and hybrid polyols such as for example poly(ester/amide), are suitable according to the invention. According to the invention, preferred polyols are polytetramethylene ether glycol, polyethylene glycols, polypropylene glycols, polyadipates, polycarbonates/polycarbonate diols and polycaprolactone.

In another embodiment, the present invention also relates to a composition as described above, wherein the polyol composition comprises a polyol selected from the group consisting of polyethers, polyesters, polycaprolactones and polycarbonates.

Suitable polyols are for example polyetherols such as polytrimethylene oxide or polytetramethylene oxide.

Suitable block copolymers are for example those having ether and ester blocks, for example polycaprolactone having polyethylene oxide or polypropylene oxide end blocks, or else polyethers having polycaprolactone end blocks. According to the invention, preferred polyetherols are polyethylene glycols and polypropylene glycols. Polycaprolactone is also preferred.

In a particularly preferred embodiment, the polyol employed has a number-average molecular weight Mn in the range from 500 g/mol to 4000 g/mol, preferably in the range from 800 g/mol to 3000 g/mol.

Mixtures of different polyols may also be employed according to the invention. The polyols/the polyol composition employed preferably have an average functionality between 1.8 and 2.3, preferably between 1.9 and 2.2, in particular 2. The polyols employed according to the invention preferably have only primary hydroxyl groups.

According to the invention, the polyol employed may also have further groups, for example suitable end groups (EG2). However, within the scope of the present invention it is also possible to employ polyol mixtures comprising at least one polyol without end groups (EG1) and (EG2) and at least one polyol which has at least one end group (EG2).

According to the invention, the polyol composition may also comprise a solvent. Suitable solvents are known per se to those skilled in the art.

A polyisocyanate composition is employed according to the invention for preparing the thermoplastic polyurethane.

Preferred polyisocyanates within the context of the present invention are diisocyanates, especially aliphatic or aromatic diisocyanates.

Within the context of the present invention, pre-reacted products, in which a portion of the OH components is reacted with an isocyanate in a preceding reaction step, can additionally be employed as isocyanate components. The products obtained are reacted with the remaining OH components in a subsequent step, the actual polymer reaction, thus forming the thermoplastic polyurethane.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylenedicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylenedicyclohexyl 4,4'-, 2,4'- and/or 2,2'-diisocyanate (H12MDI).

Suitable aromatic diisocyanates are especially naphthylene 1,5-diisocyanate (NDI), tolylene 2,4- and/or 2,6-diisocyanate (TDI), diphenylmethane 2,2'-, 2,4'- and/or 4,4'-diisocyanate (MDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, 3,3'-dimethyldiphenyl diisocyanate, diphenylethane 1,2-diisocyanate and/or phenylene diisocyanate.

In a further embodiment, the present invention also relates to a composition as described above, wherein the isocyanate composition comprises at least one isocyanate is selected from the group consisting of diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), hexamethylene 1,6-diisocyanate (HDI), 1-isocyanato-3,3,5-trimethyl-5-isocyanatomethylcyclohexane and methylenedicyclohexyl 4,4'-, 2,4'- and/or 2,2'-diisocyanate (H12MDI), and 1-isocyanato-3,3,5-trimethyl-5-isocyanatomethylcyclohexane (isophorone diisocyanate, IPDI) or derivatives of these isocyanates.

It is also possible within the context of the present invention to employ higher-functionality isocyanates, by way of example triisocyanates, for example triphenylmethane 4,4',4''-triisocyanate, also the cyanurates of the aforementioned diisocyanates, and also the oligomers obtainable by partial reaction of diisocyanates with water, for example the biurets of the aforementioned diisocyanates, and additionally oligomers that can be obtained by specific reaction of semiblocked diisocyanates with polyols having on average more than two and preferably three or more hydroxyl groups.

According to the invention, the isocyanate employed may also have further groups, for example suitable end groups (EG1). However, within the scope of the present invention it is also possible to employ isocyanate mixtures comprising at least one isocyanate without end groups (EG1) and (EG2) and at least one isocyanate which has at least one end group (EG1).

According to the invention, the polyisocyanate composition may also comprise one or more solvents. Suitable solvents are known to those skilled in the art. Suitable examples are nonreactive solvents such as ethyl acetate, methyl ethyl ketone and hydrocarbons.

Also employable within the context of the present invention are crosslinkers, for example the aforementioned higher-functionality polyisocyanates or polyols or else other higher-functionality molecules having a plurality of isocyanate-reactive functional groups. It is likewise possible within the context of the present invention to achieve crosslinking of the products through an excess of the isocyanate groups employed with respect to the hydroxyl groups.

According to the invention, the components (i) and (ii) are employed in a ratio such that the molar ratio of the sum total of the functionalities of the polyol composition employed including chain extenders to the sum total of the functionalities of the isocyanate composition employed is in the range from 0.5:1 to 3:1, for example in the range from 0.8 to 1 to 1.3:1. Preferably, the ratio is in the range from 0.9:1 to 1.2:1, more preferably in the range from 0.965:1 to 1.05:1 and particularly preferably in the range from 0.98:1 to 1.03:1. The sum total of the functionalities within the context of the present invention is understood to be the sum total of the reactive groups and the blocked groups, that is to say the end groups (EG1) and (EG2).

In an alternative embodiment, the present invention also relates to a process in which the the components (i) and (ii) are employed in a ratio such that the molar ratio of the sum total of the free functionalities of the polyol composition employed including chain extenders to the sum total of the free functionalities of the isocyanate composition employed is in the range from 0.5:1 to 3:1, for example in the range from 0.8 to 1 to 1.3:1. Preferably, the ratio is in the range from 0.9:1 to 1.2:1, more preferably in the range from 0.965:1 to 1.05:1 and particularly preferably in the range from 0.98:1 to 1.03:1. The sum total of the free functionalities is understood within the context of the present invention to be the sum total of the reactive groups.

The molecular weight of the thermoplastic polyurethane (TPU1) according to the invention may vary within broad ranges. It is particularly advantageous for the thermoplastic polyurethane (TPU1) to have a molecular weight in the range from 2000 to 50 000 g/mol, determined by means of GPC, more preferably in the range from 5000 to 40 000 g/mol. In a further embodiment, the present invention also relates to a composition as described above, wherein the thermoplastic polyurethane has a molecular weight in the range from 2000 to 50 000 g/mol, determined by means of GPC.

According to the invention, further additives, for example catalysts or auxiliaries and additions, may be added during the reaction of components (i) and (ii). Additions and auxiliaries are known per se to those skilled in the art. Combinations of two or more additives may also be employed according to the invention.

In the context of the present invention the term additive is to be understood as meaning in particular catalysts, auxiliaries and additions, in particular stabilizers, nucleating agents, release agents, demolding aids, fillers, flame retardants or crosslinkers.

Suitable additives or additions are for example stabilizers, nucleating agents, fillers, for example silicates, or crosslinkers, for example polyfunctional aluminosilicates.

In a further embodiment the present invention accordingly relates to a thermoplastic polyurethane as described above, wherein the thermoplastic polyurethane comprises at least one additive.

Examples of auxiliaries and additions include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additions can be found, for example, in Kunststoffhandbuch, volume VII, edited by Vieweg and Höchtlen, Carl Hanser Verlag, Munich, 1966 (pp 103-113).

Suitable catalysts are likewise known in principle from the prior art and especially relate to the reaction of nucleophiles with isocyanates, but also to the deblocking reaction. Suitable catalysts are for example organic metal compounds selected from the group consisting of tin organyls, titanium organyls, zirconium organyls, hafnium organyls, bismuth organyls, zinc organyls, aluminum organyls and iron organyls, for example tin organyl compounds, preferably tin dialkyls such as dimethyltin or diethyltin, or tin organyl compounds of aliphatic carboxylic acids, preferably tin diacetate, tin dilaurate, dibutyltin diacetate, dibutyltin dilaurate, bismuth compounds, such as bismuth alkyl compounds or the like, or iron compounds, preferably iron(MI) acetylacetonate, or the metal salts of carboxylic acids, for example tin(II) isooctoate, tin dioctoate, titanate esters or bismuth(III) neodecanoate.

In a preferred embodiment the catalysts are selected from tin compounds and bismuth compounds, more preferably tin alkyl compounds or bismuth alkyl compounds. Tin(II) isooctoate and bismuth neodecanoate are particularly suitable.

The catalysts are typically employed in amounts of 0 to 2000 ppm, preferably 1 ppm to 1000 ppm, more preferably 2 ppm to 500 ppm and most preferably of 5 ppm to 300 ppm.

In a further aspect the present invention also relates to a process for preparing a composition (Z1) comprising a thermoplastic polyurethane, comprising the reaction at least of components (i) and (ii):
  (i) at least one polyisocyanate composition,
  (ii) at least one polyol composition,
wherein the polyisocyanate composition comprises an isocyanate (I1) having end groups (EG1) that can be eliminated at a temperature (T1) to form reactive groups,
or
wherein the polyol composition comprises a polyol having end groups (EG2) that can be eliminated at a temperature (T2) to form reactive groups,
or
wherein the polyisocyanate composition comprises an isocyanate (I1) having end groups (EG1) and the polyol composition comprises a polyol having end groups (EG2) that can be eliminated at a temperature (T1) and (T2), respectively, to form reactive groups,
wherein the temperature (T1) and the temperature (T2) are each greater than or equal to 60° C., and components (i) and (ii) are reacted at a temperature that is lower than the temperature (T1) and the temperature (T2).

The process according to the invention comprises a plurality of embodiments. It is thus firstly possible for the polyisocyanate composition to comprise an isocyanate (I1) having end groups (EG1) that can be eliminated at a temperature (T1) to form reactive groups. The proportion of end groups (EG1) can vary within suitable ranges here. For example, within the context of the present invention, 0.01% to 40 mol % and preferably 1 to 25 mol % of the isocyanate groups in (I1) are blocked with end groups (EG1).

A suitable isocyanate composition is obtainable, for example, by reacting an isocyanate with a suitable amount of a compound which forms an end group (EG) with an isocyanate group.

It is moreover possible for the polyol composition to comprise a polyol having end groups (EG2) that can be eliminated at a temperature (T2) to form reactive groups. According to the invention, the chain extender may also have end groups (EG2) here. The proportion of end groups (EG2) can vary within suitable ranges here. For example, within the context of the present invention, 0.01 mol % to 40 mol % and preferably 1 mol % to 25 mol % of the reactive groups of the polyol and/or of the chain extender are blocked with end groups (EG2).

It is furthermore possible within the context of the present invention for the polyisocyanate composition to comprise an isocyanate (I1) having end groups (EG1) and the polyol composition to comprise a polyol having end groups (EG2) that can be eliminated at a temperature (T1) and (T2), respectively, to form reactive groups.

Suitable compounds for forming the end groups (EG1) and (EG2) are known per se to those skilled in the art.

Compounds suitable for blocking isocyanate groups are selected, for example, from the group consisting of phenols, tertiary alcohols, active methylene compounds, amines, amides, imides, lactams, oximes, thiols, azoles, imidazoles and pyrazoles. Examples are monophenols such as phenol, cresols, trimethylphenols and tert-butylphenols; tertiary alcohols such as tert-butanol, tert-amyl alcohol and dimethylphenylcarbonyl; compounds that readily form enols such as ethyl acetoacetate, acetylacetone and malonic acid derivatives, for example diethyl malonate; secondary aromatic amines such as N-methylaniline, N-methyltoluidines, N-phenyltoluidine and N-phenylxylidene; amides such as methylacetamide and acetanilide; imides such as succinimide; lactams such as ε-caprolactam, laurolactam and σ-valerolactam; oximes such as acetone oximes, butanone oximes, for example methylethyl ketone oxime and cyclohexanone oximes; mercaptans such as methyl mercaptan, ethyl mercaptan, butyl mercaptan, 2-mercaptobenzothiazoles, α-naphthyl mercaptan and dodecyl mercaptan; triazoles such as 1H-1,2,4-triazoles; imidazoles such as ethylimidazole, and pyrazoles such as 3,5-dimethylpyrazole.

Blocking agents for hydroxyl groups are known in principle to those skilled in the art and are described, for example, in "Protective Groups in Organic Synthesis", John Wiley & Sons, Inc., 3rd edition, 1999, chapter 2. Typical blocking groups of polyols are tetrahydropyranyl, tetrahydrothiopyranyl, 4-methoxytetrahydropyranyl, 4-methoxytetrahydrothiopyranyl, tert-alkyl, especially tert-butyl, alkylcarbamates and arylcarbamates.

It is also possible, according to the invention, for the isocyanate employed to be a prepolymer. In a further embodiment, the present invention also relates to a process as described above, wherein the isocyanate (I1) is a prepolymer.

Within the context of the present invention, it is for example possible to initially obtain, from the isocyanate and a suitable polyol, a prepolymer which is then reacted with a suitable blocking agent to create suitable end groups (EG1) and/or (EG2) in the prepolymer. The prepolymer obtained in this way and having end groups (EG1) and/or (EG2) can then be reacted customarily with the polyol composition.

It is likewise possible within the context of the present invention for one or more of the structural components, prior to the conversion to the thermoplastic polyurethane, to be reacted with a suitable blocking agent, so that a portion of the reactive groups of the respective structural component reacts to give end groups (EG1) and/or (EG2). The structural components pretreated in this way and having end groups (EG1) and/or (EG2) may be employed within the context of the present invention and it is also possible in accordance with the invention to employ mixtures of structural components having suitable end groups and those not having any end groups (EG1) and (EG2).

Reference is made to the above statements regarding the composition of the isocyanate composition and the polyol composition.

The present invention also relates to a thermoplastic polyurethane obtainable or obtained by a process as described above. According to the invention, the thermoplastic polyurethane is solid at least in the temperature region below 50° C. This makes it possible for the thermoplastic polyurethane to be able to be processed as a powder, for example in the form of a powder having a median particle size d50 in the range from 10 to 500 μm.

In a further embodiment, the present invention also relates to a composition comprising a thermoplastic polyurethane or a thermoplastic polyurethane as described above, wherein the thermoplastic polyurethane is in the form of a powder having a median particle size d50 in the range from 10 to 500 μm.

The thermoplastic polyurethane is preferably in the form of a powder having a median particle size d50 in the range from 25 to 400 μm, more preferably having a median particle size d50 in the range from 40 to 300 μm.

The properties of the thermoplastic polyurethanes according to the invention may vary within broad ranges depending on the application. Surprisingly, it has been found that the compositions according to the invention or the thermoplastic polyurethanes according to the invention can be employed particularly readily in powder-based processing methods.

In addition, the present invention also relates to a process for producing a shaped body, comprising the steps of
(A) providing a composition (Z1) comprising a thermoplastic polyurethane as described above in the form of free-flowing particles,
(B) heating at least a locally delimited portion of the particles to a temperature (T1) or (T2) to form reactive groups that can enter into a reaction with functional groups of the thermoplastic polyurethane or a further component of the composition (Z1),
(C) cooling the composition/thermoplastic polyurethane.

According to the invention, the heating may be effected in any suitable manner known to those skilled in the art. Suitable methods are especially those enable local heating, such as targeted coherent light beams. According to the invention, IR radiation can also be used, or other suitable methods for heating the material.

According to the invention, it is also possible for the process to comprise further steps, for example a pre-treatment of the components or a post-treatment of the thermoplastic polyurethane obtained, for example a heat treatment. Accordingly, the present invention also relates in another embodiment to a process for preparing a thermoplastic polyurethane as described above, wherein the thermoplastic polyurethane obtained is heat-treated after the reaction.

According to the invention, the shaped body can for example be produced by means of conventional processes such as injection molding or extrusion.

According to the invention, the composition (Z1) comprising the thermoplastic polyurethane or the thermoplastic polyurethane according to the invention is employed in the form of free-flowing particles, for example in the form of a powder, in particular in the form of a powder having a median particle size d50 in the range from 10 to 500 µm.

In a further embodiment, the present invention therefore also relates to a process for producing a shaped body as described above, wherein the composition (Z1) or the thermoplastic polyurethane is employed in the form of a powder having a median particle size d50 in the range from 10 to 500 µm.

Processes for determining particle sizes are sufficiently known to those skilled in the art. Depending on the particle size, electrical mobility analysis, laser diffraction, sieve analysis, light microscopy or dynamic light scattering are suitable, for example, for determining particle sizes or particle size distribution. Unless otherwise stated, particle sizes are determined within the context of the present invention by means of laser diffraction of wet-dispersed powders.

The process according to the invention may for example be an extrusion process, an injection molding process or else a powder-based layer construction process.

According to a further aspect, the present invention also relates to the use of a composition according to the invention and as described above or of a thermoplastic polyurethane according to the present invention for producing a shaped body.

In a further embodiment, the present invention also relates to the use as described above, wherein the shaped body is produced by means of powder-based layer construction processes.

In this case, by means of what is known as a coater, thin powder layers are typically applied and subsequently selectively melted by means of an energy source. The surrounding powder here supports the component geometry. Complex geometries can thus be manufactured more economically than in conventional processes. Examples of powder-based layer construction processes are so-called laser sintering or high-speed sintering (HSS). In the case of laser sintering, energy is introduced by means of a directed laser beam. In the so-called high-speed sintering (HSS) process, energy is introduced by means of infrared (IR) beams combined with an IR absorber that has been selectively printed into the powder bed.

Further embodiments of the present invention are apparent from the claims and the examples. It will be appreciated that the features of the subject matter/processes/uses according to the invention that are mentioned above and elucidated below are usable not only in the combination specified in each case but also in other combinations without departing from the scope of the invention. Thus, for example, the combination of a preferred feature with a particularly preferred feature or of a feature not characterized further with a particularly preferred feature etc. is also encompassed implicitly even if this combination is not mentioned explicitly.

Exemplary embodiments of the present invention are listed below but do not restrict the present invention. In particular, the present invention also comprises those embodiments that result from the dependency references and hence combinations specified below.

1. A composition (Z1) comprising a thermoplastic polyurethane (TPU1), obtainable or obtained by reacting at least components (i) and (ii):
    (i) at least one polyisocyanate composition,
    (ii) at least one polyol composition,
wherein the thermoplastic polyurethane (TPU1) is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1),
wherein the temperature (T1) and the temperature (T2) are each greater than or equal to 60° C.

2. A composition (Z1) comprising a thermoplastic polyurethane (TPU1), obtainable or obtained by reacting at least components (i) and (ii):
    (i) at least one polyisocyanate composition,
    (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C.

3. A composition (Z1) comprising a thermoplastic polyurethane (TPU1), obtainable or obtained by reacting at least components (i) and (ii):
    (i) at least one polyisocyanate composition,
    (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C.,
and the end groups (EG1) are caprolactam groups.

4. A composition (Z1) comprising a thermoplastic polyurethane (TPU1), obtainable or obtained by reacting at least components (i) and (ii):
    (i) at least one polyisocyanate composition,
    (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C.,
and the end groups (EG1) are methyl ethyl ketone oxime groups.

5. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups (EG2), wherein the end groups (EG2) can be eliminated at a temperature (T2) to form reactive groups on the thermoplastic polyurethane (TPU1) that can enter into a reaction with functional groups of the thermoplastic polyurethane (TPU1) or of a further component of the composition (Z1),
wherein the temperature (T2) is greater than or equal to 60° C.

6. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1),
wherein the temperature (T1) and the temperature (T2) are each greater than or equal to 60° C.

7. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1),
wherein the temperature (T1) and the temperature (T2) are each greater than or equal to 60° C., and
wherein the polyol composition comprises at least one chain extender selected from compounds having at least two groups that are reactive toward isocyanate groups.

8. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C., and the end groups (EG1) are caprolactam groups,
wherein the polyol composition comprises at least one chain extender selected from compounds having at least two groups that are reactive toward isocyanate groups.

9. The composition according to any of embodiments 1 to 8, wherein the content of the sum total of end groups (EG1) and (EG2) is in the range from 0.01 to 50 mol %, based on the content of urethane groups in the thermoplastic polyurethane (TPU1).

10. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1), wherein the temperature (T1) and the temperature (T2) are each greater than or equal to 60° C.,
wherein the content of the sum total of end groups (EG1) and (EG2) is in the range from 0.01 to 50 mol %, based on the content of urethane groups in the thermoplastic polyurethane (TPU1).

11. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C.,
wherein the content of the sum total of end groups (EG1) is in the range from 0.01 to 50 mol %, based on the content of urethane groups in the thermoplastic polyurethane (TPU1).

12. A composition (Z1) comprising a thermoplastic polyurethane (TPU1), obtainable or obtained by reacting at least components (i) and (ii):
  (i) at least one polyisocyanate composition,
  (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or of a further component of the composition (Z1),
wherein the temperature (T1) is greater than or equal to 60° C.,
and the end groups (EG1) are caprolactam groups,
wherein the content of the sum total of end groups (EG1) is in the range from 0.01 to 50 mol %, based on the content of urethane groups in the thermoplastic polyurethane (TPU 1).

13. A composition (Z1) comprising a thermoplastic polyurethane (TPU1), obtainable or obtained by reacting at least components (i) and (ii):
   (i) at least one polyisocyanate composition,
   (ii) at least one polyol composition,
wherein the thermoplastic polyurethane (TPU1) is solid at least in the temperature region below 50° C. and has end groups (EG2), wherein the end groups (EG2) can be eliminated at a temperature (T2) to form reactive groups on the thermoplastic polyurethane (TPU1) that can enter into a reaction with functional groups of the thermoplastic polyurethane (TPU1) or of a further component of the composition (Z1),
wherein the temperature (T2) is greater than or equal to 60° C.,
wherein the content of the sum total of end groups (EG2) is in the range from 0.01 to 50 mol %, based on the content of urethane groups in the thermoplastic polyurethane (TPU 1).

14. A composition (Z1) comprising a thermoplastic polyurethane (TPU1), obtainable or obtained by reacting at least components (i) and (ii):
   (i) at least one polyisocyanate composition,
   (ii) at least one polyol composition,
wherein the thermoplastic polyurethane (TPU1) is solid at least in the temperature region below 50° C. and has end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1),
wherein the temperature (T1) and the temperature (T2) are each greater than or equal to 60° C.,
wherein the content of the sum total of end groups (EG1) and (EG2) is in the range from 0.01 to 50 mol %, based on the content of urethane groups in the thermoplastic polyurethane (TPU1).

15. A composition (Z1) comprising a thermoplastic polyurethane (TPU1), obtainable or obtained by reacting at least components (i) and (ii):
   (i) at least one polyisocyanate composition,
   (ii) at least one polyol composition,
wherein the thermoplastic polyurethane (TPU1) is solid at least in the temperature region below 50° C. and has end groups selected from the group consisting of end groups (EG1) and end groups (EG2), wherein the end groups (EG1) can be eliminated at a temperature (T1), and the end groups (EG2) can be eliminated at a temperature (T2), to form reactive groups on the thermoplastic polyurethane (TPU1) that can enter into a reaction with functional groups of the thermoplastic polyurethane (TPU1) or of a further component of the composition (Z1),
wherein the temperature (T1) and the temperature (T2) are each greater than or equal to 60° C., and
wherein the content of the sum total of end groups (EG1) and (EG2) is in the range from 0.01 to 50 mol %, based on the content of urethane groups in the thermoplastic polyurethane (TPU1),
wherein the polyol composition comprises at least one chain extender selected from compounds having at least two groups that are reactive toward isocyanate groups.

16. A composition (Z1) comprising a thermoplastic polyurethane (TPU1), obtainable or obtained by reacting at least components (i) and (ii):
   (i) at least one polyisocyanate composition,
   (ii) at least one polyol composition,
wherein the thermoplastic polyurethane (TPU1) is solid at least in the temperature region below 50° C. and has end groups (EG1), wherein the end groups (EG1) can be eliminated at a temperature (T1) to form reactive groups on the thermoplastic polyurethane (TPU1) that can enter into a reaction with functional groups of the thermoplastic polyurethane (TPU1) or a further component of the composition (Z1),
wherein the temperature (T1) is greater than or equal to 60° C.,
and the end groups (EG1) are caprolactam groups,
wherein the content of the sum total of end groups (EG1) and (EG2) is in the range from 0.01 to 50 mol %, based on the content of urethane groups in the thermoplastic polyurethane (TPU1),
wherein the polyol composition comprises at least one chain extender selected from compounds having at least two groups that are reactive toward isocyanate groups.

17. The composition according to any of embodiments 1 to 16, wherein the polyol composition comprises at least one chain extender selected from compounds having at least two groups that are reactive toward isocyanate groups.

18. The composition according to any of embodiments 1 to 16, wherein the composition (Z1) comprises at least one chain extender selected from compounds having at least two groups that are reactive toward isocyanate groups.

19. The composition according to any of embodiments 1 to 18, wherein the chain extender is selected from the group consisting of diamines and diols having a molecular weight of up to 500 g/mol.

20. The composition according to any of embodiments 1 to 19, wherein the thermoplastic polyurethane has a molecular weight in the range from 2000 to 50 000 g/mol, determined by means of GPC.

21. The composition according to any of embodiments 1 to 20, wherein the isocyanate composition comprises at least one isocyanate is selected from the group consisting of diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), hexamethylene 1,6-diisocyanate (HDI), 1-isocyanato-3, 3,5-trimethyl-5-isocyanatomethylcyclohexane and methylenedicyclohexyl 4,4'-, 2,4'- and/or 2,2'-diisocyanate (H12MDI), and 1-isocyanato-3,3,5-trimethyl-5-isocyanatomethylcyclohexane (isophorone diisocyanate, IPDI) or derivatives of these isocyanates.

22. The composition according to any of embodiments 1 to 21, wherein the polyol composition comprises a polyol selected from the group consisting of polyethers, polyesters, polycaprolactones and polycarbonates.

23. The composition according to any of embodiments 1 to 22, wherein the content of the sum total of end groups (EG1) and (EG2) is in the range from 0.01 to 50 mol %, based on the content of urethane groups in the thermoplastic polyurethane (TPU1).

24. The composition according to any of embodiments 1 to 23, wherein the polyol composition comprises at least one chain extender selected from compounds having at least two groups that are reactive toward isocyanate groups.

25. The composition according to any of embodiments 1 to 24, wherein the composition (Z1) comprises at least one chain extender selected from compounds having at least two groups that are reactive toward isocyanate groups.

26. The composition according to any of embodiments 1 to 25, wherein the chain extender is selected from the group consisting of diamines and diols having a molecular weight of up to 500 g/mol.

27. The composition according to any of embodiments 1 to 26, wherein the thermoplastic polyurethane has a molecular weight in the range from 2000 to 50 000 g/mol, determined by means of GPC.

28. The composition according to any of embodiments 1 to 27, wherein the isocyanate composition comprises at least one isocyanate is selected from the group consisting of diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), hexamethylene 1,6-diisocyanate (HDI), 1-isocyanato-3, 3,5-trimethyl-5-isocyanatomethylcyclohexane and methylenedicyclohexyl 4,4'-, 2,4'- and/or 2,2'-diisocyanate (H12MDI), and 1-isocyanato-3,3,5-trimethyl-5-isocyanatomethylcyclohexane (isophorone diisocyanate, IPDI) or derivatives of these isocyanates.

29. The composition according to any of embodiments 1 to 28, wherein the polyol composition comprises a polyol selected from the group consisting of polyethers, polyesters, polycaprolactones and polycarbonates.

30. A process for preparing a composition (Z1) comprising a thermoplastic polyurethane, comprising the reaction at of least components (i) and (ii):
(i) at least one polyisocyanate composition,
(ii) at least one polyol composition,
wherein the polyisocyanate composition comprises an isocyanate (I1) having end groups (EG1) that can be eliminated at a temperature (T1) to form reactive groups,
or
wherein the polyol composition comprises a polyol having end groups (EG2) that can be eliminated at a temperature (T2) to form reactive groups,
or
wherein the polyisocyanate composition comprises an isocyanate (I1) having end groups (EG1) and the polyol composition comprises a polyol having end groups (EG2) that can be eliminated at a temperature (T1) and (T2), respectively, to form reactive groups,
wherein the temperature (T1) and the temperature (T2) are each greater than or equal to 60° C.,
and components (i) and (ii) are reacted at a temperature that is lower than the temperature (T1) and the temperature (T2).

31. A process for preparing a composition (Z1) comprising a thermoplastic polyurethane, comprising the reaction at least of components (i) and (ii):
(i) at least one polyisocyanate composition,
(ii) at least one polyol composition,
wherein the polyisocyanate composition comprises an isocyanate (I1) having end groups (EG1) that can be eliminated at a temperature (T1) to form reactive groups,
wherein the temperature (T1) is greater than or equal to 60° C., and components (i) and (ii) are reacted at a temperature that is lower than the temperature (T1).

32. A process for preparing a composition (Z1) comprising a thermoplastic polyurethane, comprising the reaction at least of components (i) and (ii):
(i) at least one polyisocyanate composition,
(ii) at least one polyol composition,
wherein the polyisocyanate composition comprises an isocyanate (I1) having end groups (EG1) that can be eliminated at a temperature (T1) to form reactive groups,
and the end groups (EG1) are caprolactam groups,
wherein the temperature (T1) is greater than or equal to 60° C.,
and components (i) and (ii) are reacted at a temperature that is lower than the temperature (T1).

33. A process for preparing a composition (Z1) comprising a thermoplastic polyurethane, comprising the reaction at least of components (i) and (ii):
(i) at least one polyisocyanate composition,
(ii) at least one polyol composition,
wherein the polyisocyanate composition comprises an isocyanate (I1) having end groups (EG1) that can be eliminated at a temperature (T1) to form reactive groups,
and the end groups (EG1) are methyl ethyl ketone oxime groups,
wherein the temperature (T1) is greater than or equal to 60° C.,
and components (i) and (ii) are reacted at a temperature that is lower than the temperature (T1).

34. A process for preparing a composition (Z1) comprising a thermoplastic polyurethane, comprising the reaction at least of components (i) and (ii):
(i) at least one polyisocyanate composition,
(ii) at least one polyol composition,
wherein the polyol composition comprises a polyol having end groups (EG2) that can be eliminated at a temperature (T2) to form reactive groups,
wherein the the temperature (T2) is greater than or equal to 60° C.,
and components (i) and (ii) are reacted at a temperature that is lower than the temperature (T2).

35. A process for preparing a composition (Z1) comprising a thermoplastic polyurethane, comprising the reaction at least of components (i) and (ii):
(i) at least one polyisocyanate composition,
(ii) at least one polyol composition,
wherein the polyisocyanate composition comprises an isocyanate (I1) having end groups (EG1) and the polyol composition comprises a polyol having end groups (EG2) that can be eliminated at a temperature (T1) and (T2), respectively, to form reactive groups,
wherein the temperature (T1) and the temperature (T2) are each greater than or equal to 60° C.,
and components (i) and (ii) are reacted at a temperature that is lower than the temperature (T1) and the temperature (T2).

36. The process according to any of embodiments 30 to 35, wherein the isocyanate (I1) is a prepolymer.

37. The process according to any of embodiments 30 to 34, wherein the polyol composition comprises at least one chain extender selected from compounds having at least two groups that are reactive toward isocyanate groups.

38. The process according to any of embodiments 30 to 36, wherein in the reaction, as component (iii), at least one chain extender is employed that is selected from compounds having at least two groups that are reactive toward isocyanate groups.

39. The process according to any of embodiments 30 to 37, wherein the content of the sum total of end groups (EG1) and (EG2) is in the range from 0.01 to 50 mol %, based on the content of urethane groups in the thermoplastic polyurethane (TPU1).

40. The process according to any of embodiments 30 to 39, wherein the polyol composition comprises at least one chain extender selected from compounds having at least two groups that are reactive toward isocyanate groups.

41. The process according to any of embodiments 30 to 40, wherein the composition (Z1) comprises at least one chain extender selected from compounds having at least two groups that are reactive toward isocyanate groups.

42. The process according to any of embodiments 30 to 41, wherein the chain extender is selected from the group consisting of diamines and diols having a molecular weight of up to 500 g/mol.

43. The process according to any of embodiments 30 to 42, wherein the thermoplastic polyurethane has a molecular weight in the range from 2000 to 50 000 g/mol, determined by means of GPC.

44. The process according to any of embodiments 30 to 43, wherein the isocyanate composition comprises at least one isocyanate is selected from the group consisting of diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), hexamethylene 1,6-diisocyanate (HDI), 1-isocyanato-3, 3,5-trimethyl-5-isocyanatomethylcyclohexane and methylenedicyclohexyl 4,4'-, 2,4'- and/or 2,2'-diisocyanate (H12MDI), and 1-isocyanato-3,3,5-trimethyl-5-isocyanatomethylcyclohexane (isophorone diisocyanate, IPDI) or derivatives of these isocyanates.

45. The process according to any of embodiments 30 to 44, wherein the polyol composition comprises a polyol selected from the group consisting of polyethers, polyesters, polycaprolactones and polycarbonates.

46. A composition comprising a thermoplastic polyurethane obtainable or obtained by a process according to any of embodiments 30 to 45.

47. The composition according to embodiment 46, wherein the thermoplastic polyurethane is in the form of a powder having a median particle size d50 in the range from 10 to 500 μm.

48. A process for producing a shaped body, comprising the steps of
(A) providing a composition (Z1) comprising a thermoplastic polyurethane according to any of embodiments 1 to 29 or a composition comprising a thermoplastic polyurethane according to either of embodiments 46 and 47 in the form of free-flowing particles,
(B) heating at least a locally delimited portion of the particles to a temperature (T1) or (T2) to form reactive groups that can enter into a reaction with functional groups of the thermoplastic polyurethane or of a further component of the composition (Z1),
(C) cooling the composition/thermoplastic polyurethane.

49. The process according to embodiment 48, wherein the composition (Z1) is employed in the form of a powder having a median particle size d50 in the range from 10 to 500 μm.

50. The use of a composition according to any of embodiments 1 to 29 or of a composition comprising a thermoplastic polyurethane according to either of embodiments 46 and 47 for the production of a shaped body.

51. The use according to embodiment 50, wherein the shaped body is produced by means of powder-based layer construction processes.

52. The use according to embodiment 50, wherein the shaped body is produced by means of extrusion or injection molding.

53. A shaped body obtainable or obtained by a process according to either of embodiments 48 and 49.

Figure 1:
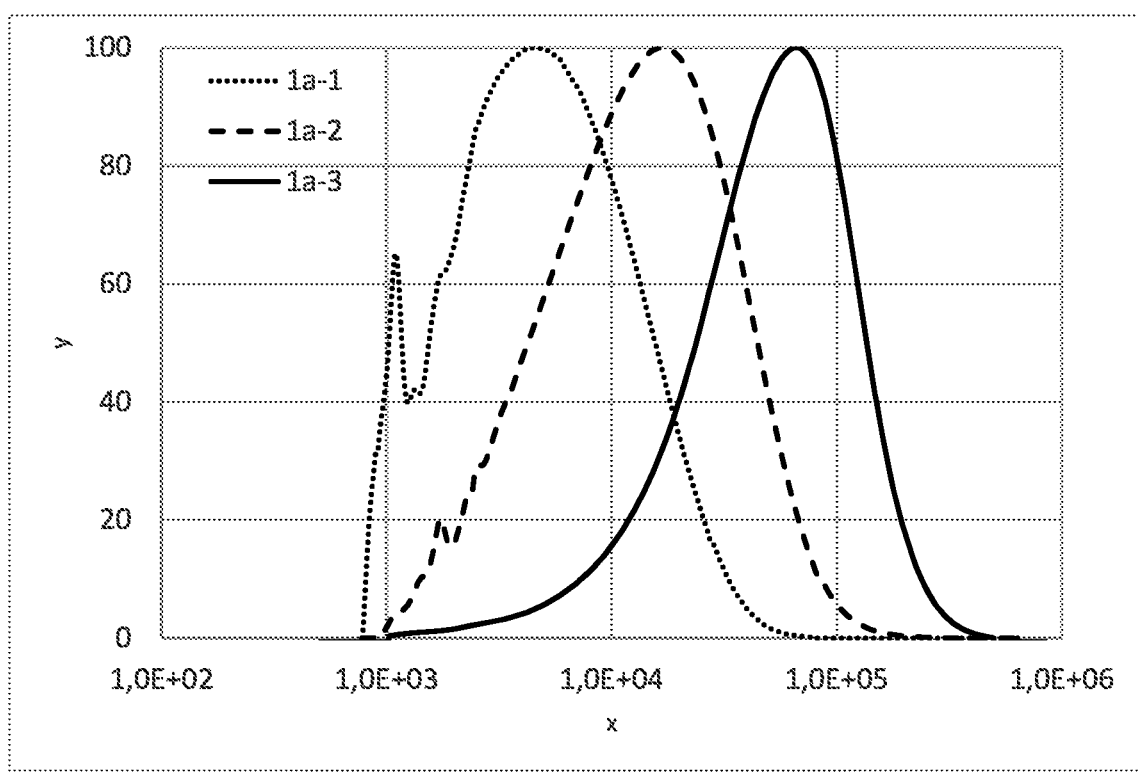
FIG. 1 shows GPC curves of the polyurethanes obtained by use example 1a, where the molecular weight is plotted in g/mol on the x axis and the normalized intensity in % on the y axis.

The examples below serve to illustrate the invention, but are in no way restrictive in respect of the subject matter of the present invention.

EXAMPLES

1. Feedstocks

Isocyanate 1: is diphenylmethane 4,4'-diisocyanate (4,4'-MDI), molar mass 250.26 g/mol Isocyanate 2: is a mixture of diphenylmethane 4,4'-diisocyanate (4,4'-MDI; molar mass 250.26 g/mol), N-[4-[(4-isocyanatophenyl)methyl]phenyl]-2-oxoazepane-1-carboxamides (1CL-4,4'-MDI; molar mass 363.41 g/mol) and 2-oxo-N-[4-[[4-[(2-oxoazepane-1-carbonyl) amino]phenyl]methyl]phenyl]azepane-1-carboxamides (2CL-4,4'-MDI; molar mass 476.24 g/mol) having an NCO value of 18.5%

Isocyanate 3: is a mixture of diphenylmethane 4,4'-diisocyanate (4,4'-MDI; molar mass 250.26 g/mol), (1-methylpropylideneamino)-N-[4-[(4-isocyanatophenyl) methyl]phenyl]carbamates (1MEKO-4,4'-MDI; molar mass 339.39 g/mol) and (1-methylpropylideneamino)-N-[4-[[4-[1-methylpropylideneamino]oxycarbonylamino]phenyl]methyl]phenyl]carbamates (2MEKO-4,4'-MDI; molar mass 424.49 g/mol) having an NCO value of 19.4%

Polymer polyol 1: polyether diol having OH number of about 112 formed from tetrahydrofuran (MW: approx. 1000)

Polymer polyol 2: polyether diol having OH number of about 56 formed from tetrahydrofuran (MW: approx. 2000)

Chain extender 1: is butane-1,4-diol, molar mass 90.12 g/mol

Chain extender 2: is hexane-1,6-diol, molar mass 118.18 g/mol

2. Inventive Examples

It has been found that, surprisingly, by the use of blocked isocyanates in a prepolymer process or as co-isocyanates in a one-shot process in the presence of free chain extenders, solid polyurethanes are preparable which increase in molecular weight at temperatures>100° C., preferably at temperatures>150° C.

2.1 Example 1

TABLE 1

Formulations 1a and 1b

|  | Comparison 1a | Comparison 1b |
|---|---|---|
| Isocyanate 1 [g] | 27.7 | 27.2 |
| Polymer polyol 1 [g] | 19.4 | 19.1 |
| Polymer polyol 2 [g] | 38.8 | 38.2 |
| Caprolactam [g] | 7.3 | 7.2 |
| Chain extender 1 [g] | 6.9 |  |
| Chain extender 2 [g] |  | 8.2 |

2.1.1 Example 1a

Preparation of the Prepolymer

Isocyanate 1 is initially charged at 60° C. in a 250 ml four-neck neck flask provided with a PT100 thermocouple, nitrogen feed, stirrer and heating mantle, and polymer polyol 1 and 2 are added at this temperature. The reaction mixture was heated to 80° C. and stirred for 2 hours at 80° C. Next, caprolactam was added a little at a time to this reaction mixture and the mixture was stirred for a further 2 h. This resulting prepolymer was then cooled to room temperature and used without further treatment for the subsequent application.

Preparation of the Polyurethane Based on the Prepolymer

The resulting prepolymer was reacted in a glass beaker or tinplate container with chain extender 1 while stirring at 80° C., and a solid white mass was obtained.

2.1.2 Example 1b

Preparation of the Prepolymer

Isocyanate 1 is initially charged at 60° C. in a 250 ml four-neck neck flask provided with a PT100 thermocouple, nitrogen feed, stirrer and heating mantle, and polymer polyol 1 and 2 are added at this temperature. The reaction mixture was heated to 80° C. and stirred for 2 hours at 80° C. Next, caprolactam was added a little at a time to this reaction mixture and the mixture was stirred for a further 2 h. This resulting prepolymer was then cooled to room temperature and used without further treatment for the subsequent application.

Preparation of the Polyurethane Based on Prepolymers

The resulting prepolymer was reacted in a glass beaker or tinplate container with chain extender 2 while stirring at 80° C., and a solid white mass was obtained.

2.1.3 Application of the Examples 1

Use Example 1a

The solid material obtained from example 1a was treated for 5 min at 200° C. Analysis was by means of gel permeation chromatography (GPC) before (1a-1) and after (1a-2) and an increase in molecular weight was observed.

Furthermore, the material obtained from example 1a was firstly heat-treated at 80° C. for 15 h, then treated for 5 min at 200° C. and subsequently heat-treated further for 20 h at 100° C. (1a-3).

TABLE 2

| Example | Conditions/further treatment | Molecular weight (Mw) [g/mol] |
|---|---|---|
| 1a-1 | — | 7000 |
| 1a-2 | 5 min at 200° C. | 19 000 |
| 1a-3 | 15 h at 80° C.; 5 min at 200° C.; 20 h at 100° C. | 66 000 |

The results of the GPC measurements are shown in FIG. 1.

Use Example 1b

The solid material obtained from example 1a was treated for 5 min at 200° C. Analysis was by means of gel permeation chromatography (GPC) before (1b-1) and after (1b-2) and an increase in molecular weight was observed.

Furthermore, the material obtained from example 1a was firstly heat-treated at 80° C. for 15 h, then treated for 5 min at 200° C. and subsequently heat-treated further for 20 h at 100° C. (1b-3).

TABLE 3

| Example | Conditions/further treatment | Molecular weight (Mw) [g/mol] |
|---|---|---|
| 1b-1 | — | 9900 |
| 1b-2 | 5 min at 200° C. | 30 000 |
| 1b-3 | 15 h at 80° C.; 5 min at 200° C.; 20 h at 100° C. | 66 000 |

Figure 2:
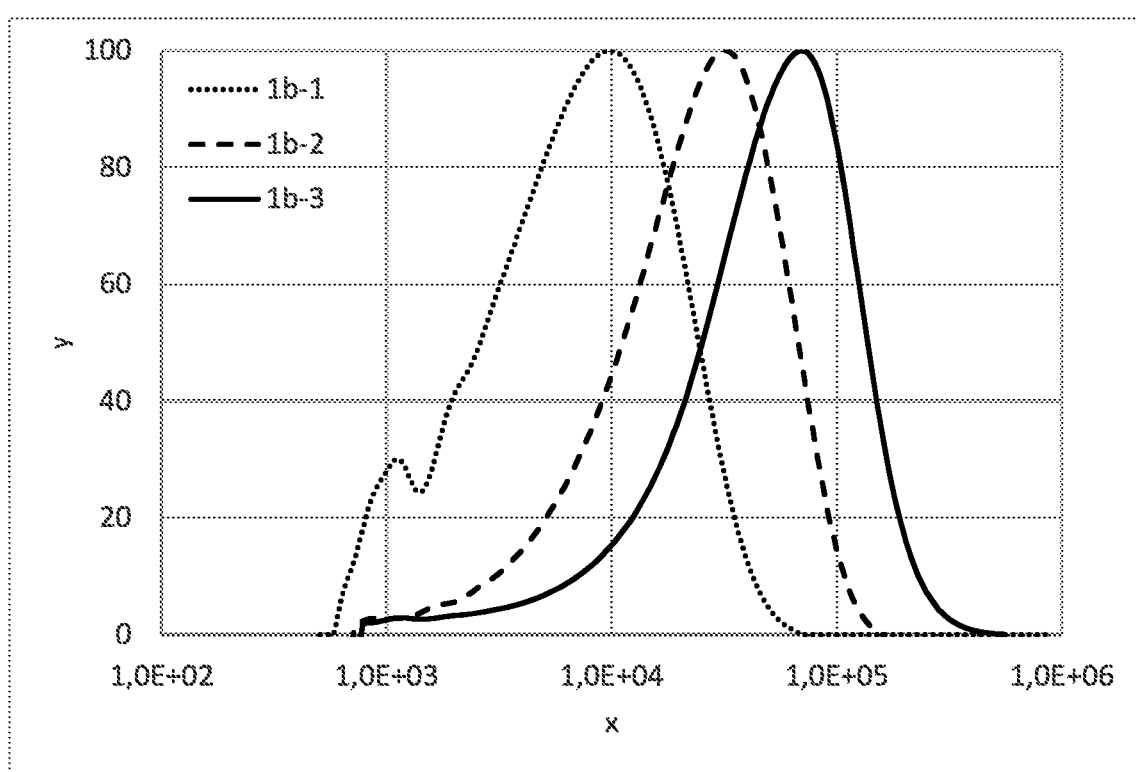
FIG. 2 shows GPC curves of the polyurethanes obtained by use example 1b, where the molecular weight is plotted in g/mol on the x axis and the normalized intensity in % on they axis.
Figure 3:
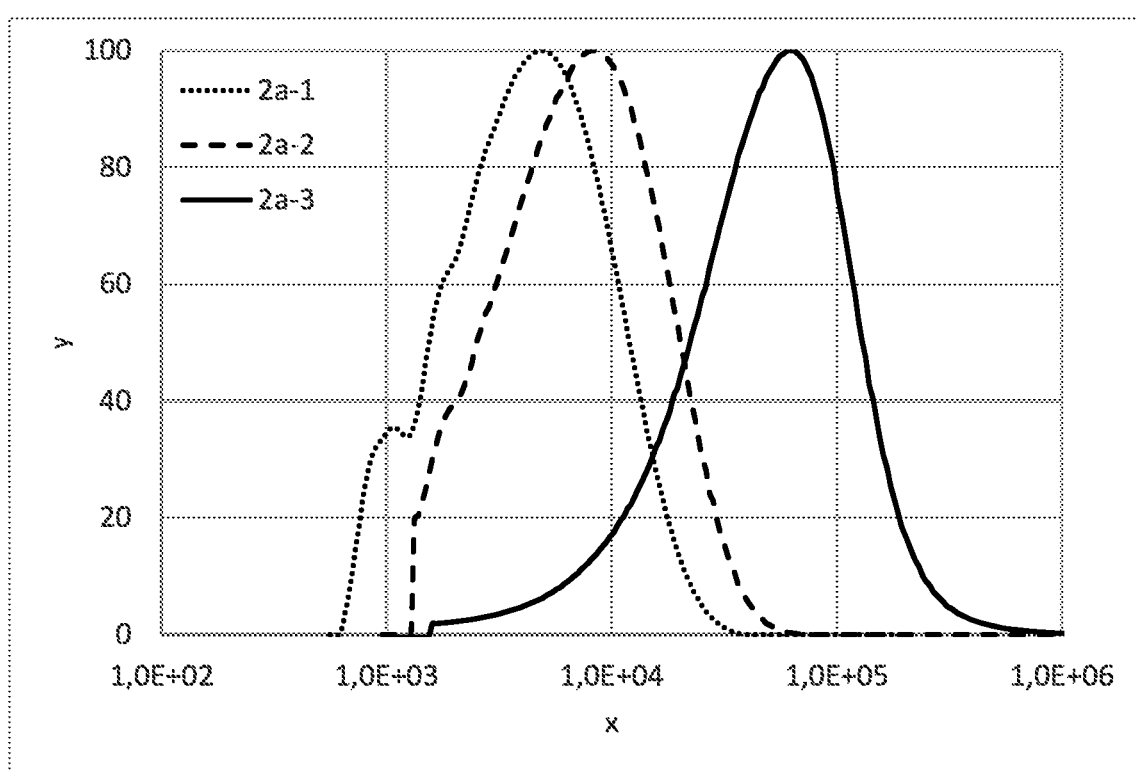
FIG. 3 shows GPC curves of the polyurethanes obtained by use example 2a, where the molecular weight is plotted in g/mol on the x axis and the normalized intensity in % on the y axis.
Figure 4:
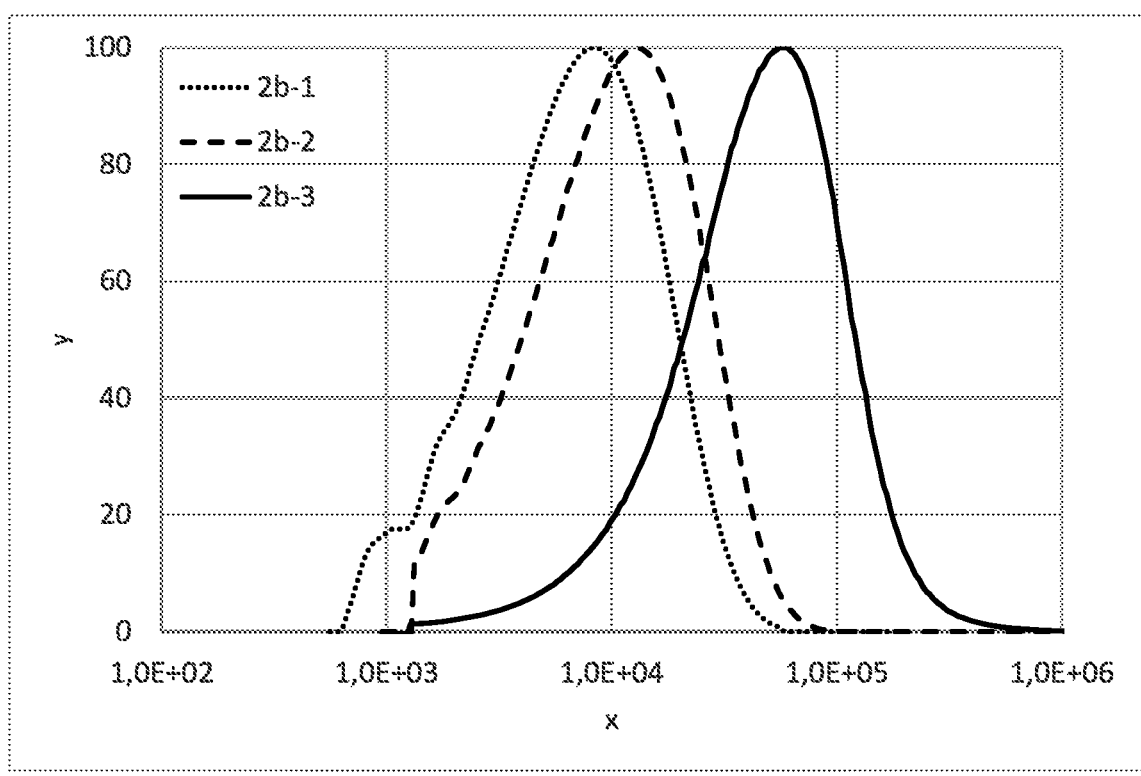
FIG. 4 shows GPC curves of the polyurethanes obtained by use example 2b, where the molecular weight is plotted in g/mol on the x axis and the normalized intensity in % on the y axis.
Figure 5:
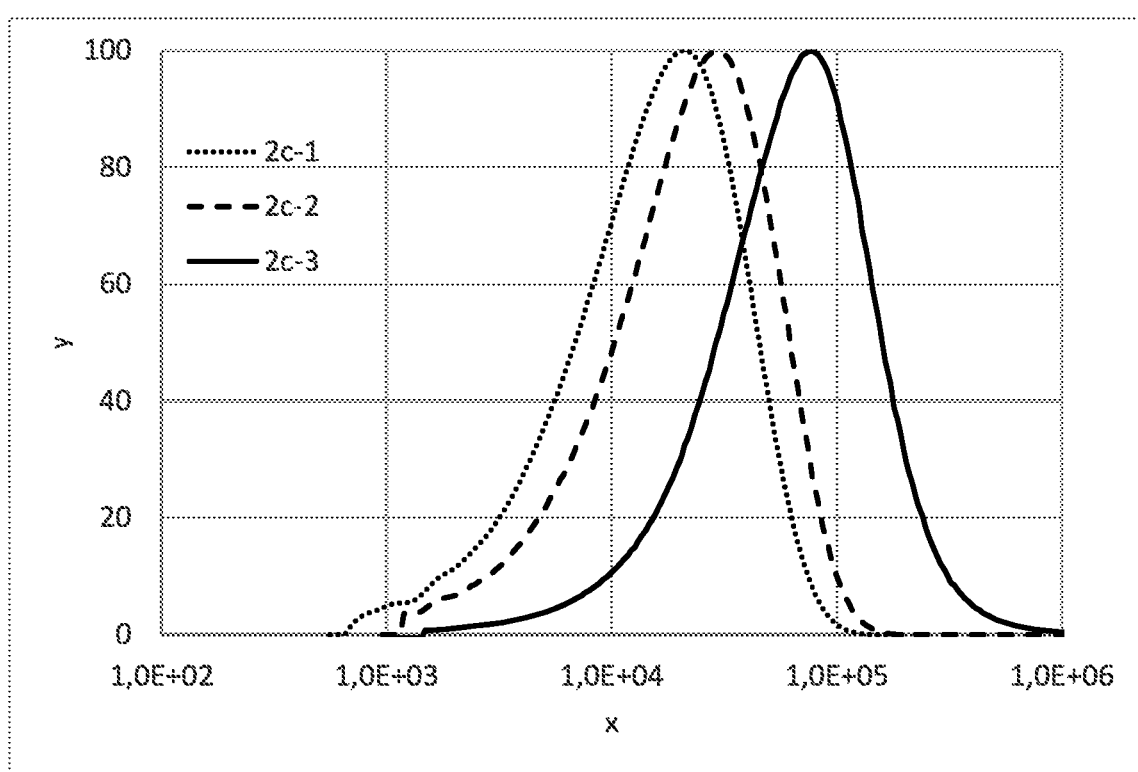
FIG. 5 shows GPC curves of the polyurethanes obtained by use example 2c, where the molecular weight is plotted in g/mol on the x axis and the normalized intensity in % on the y axis.
Figure 6:
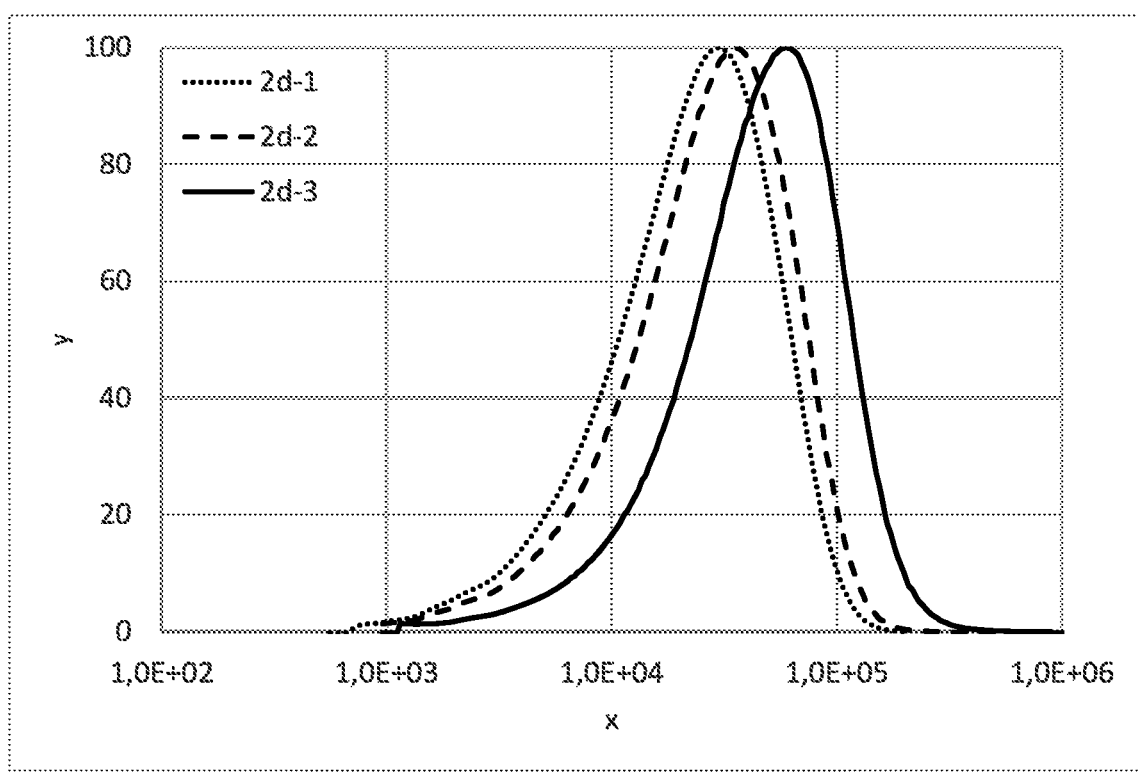
FIG. 6 shows GPC curves of the polyurethanes obtained by use example 2d, where the molecular weight is plotted in g/mol on the x axis and the normalized intensity in % on the y axis.

The results of the GPC measurements are shown in FIG. 2.

2.2 Example 2

2.2.1 Preparation of Isocyanate 2

Isocyanate 1 (78.6 g) was initially charged at 60° C. in a round-neck flask provided with a PT100 thermocouple, nitrogen feed, stirrer and heating mantle, and caprolactam (21.4 g) was added at this temperature. The reaction mixture was heated to 80° C. and stirred for 45 min at 80° C. Next, the isocyanate 2 obtained here was cooled to room temperature and used without further treatment for the reaction with polymer polyol and chain extender (calculated NCO: 18.5%).

General Process for Preparing the Solid Polyurethane in the One-Shot Process

Polymer polyol 1 is reacted together with chain extender 2, isocyanate 1 and isocyanate 2 while stirring. The resulting reaction mixture is poured out onto a heatable and optionally Teflon-coated table and reacted to completion for approximately 60 minutes at 120° C. The thus obtained polymer sheet is then heat-treated at 80° C. for 15 hours.

TABLE 4

Formulations 2a-2d

| | Comparison 2a | Comparison 2b | Comparison 2c | Comparison 2d |
|---|---|---|---|---|
| Isocyanate 1 [g] | 13.1 | 26.1 | 39.1 | 46.8 |
| Isocyanate 2 [g] | 49.7 | 33.3 | 16.7 | 6.8 |
| Polymer polyol 1 [g] | 83.0 | 83.0 | 83.0 | 83.0 |
| Chain extender 2 [g] | 14.8 | 14.8 | 14.8 | 14.8 |

2.2.2 Application of the Examples 2

Use Examples 2a-2d

The solid material obtained from each of examples 2a-d was analyzed by means of gel permeation chromatography (GPC). Examples 2a-d were then treated for 5 min at 200° C. and subsequently heat-treated for a further 20 h at 100° C. The material was additionally stored at 100° C. for 20 h.

TABLE 5

| | Molecular weights (Mw) [g/mol] | | | |
|---|---|---|---|---|
| Conditions/further treatment | Comparison 2a | Comparison 2b | Comparison 2c | Comparison 2d |
| (1) — | 6000 | 9200 | 20 000 | 29 000 |
| (2) 20 h at 100° C. | 9300 | 13 000 | 28 000 | 35 000 |
| (3) 5 min at 200° C.; 20 h at 100° C. | 69 000 | 62 000 | 88 000 | 59 000 |

The results of the GPC measurements for examples 2a to 2d are shown in FIGS. 3 to 6.

2.3 Example 3

2.3.1 Preparation of Isocyanate 3

Isocyanate 1 (1.179 kg) was initially charged at 60° C. in a round-neck flask provided with a PT100 thermocouple, nitrogen feed, stirrer and heating mantle, and methyl ethyl ketone oxime (0.247 kg) was added at this temperature. The reaction mixture was heated to 80° C. and stirred for 60 min at 80° C. Next, the isocyanate 3 obtained here was cooled to room temperature and used without further treatment for the reaction with polymer polyol and chain extender (calculated NCO: 19.4%).

General Process for Preparing the Solid Polyurethane in the One-Shot Process

Polymer polyol 1 is reacted together with chain extender 2, isocyanate 1 and isocyanate 3 while stirring. The resulting reaction mixture is poured out onto a heatable and optionally Teflon-coated table and reacted to completion for approximately 60 minutes at 120° C. The thus obtained polymer sheet is then heat-treated at 80° C. for 15 hours.

TABLE 6

Formulation 3

| | Comparison 3 |
|---|---|
| Isocyanate 1 [g] | 569.1 |
| Isocyanate 3 [g] | 78.1 |
| Polymer polyol 1 [g] | 1000.0 |
| Chain extender 2 [g] | 179.3 |

2.3.2 Application of Example 3

Use Example 3

In each case, the solid material obtained from example 3 was analyzed by means of gel permeation chromatography (GPC). Example 3 was then treated for 5 min at 200° C. and subsequently heat-treated for a further 20 h at 100° C. The material was additionally stored at various temperatures for 20-24 h.

TABLE 7

| Conditions/further treatment | Molecular weights (Mw) [g/mol] Comparison 3 |
|---|---|
| (1) — | 44 000 |
| (2) 24 h at 60° C. | 45 000 |
| (3) 24 h at 80° C. | 51 000 |
| (4) 20 h at 100° C. | 96 000 |
| (5) 5 min at 200° C.; 20 h at 100° C. | 95 000 |

3. Properties of the Solid Polyurethane and Resulting Test Specimens

The following properties of the polyurethanes obtained were determined by the methods specified:

Determination of molecular weight: In accordance with the prior art, the molecular weight was ascertained according to DIN55672-2. In this case calibration was performed using PMMA.

NCO Value Determination: Determination of the NCO content was conducted according to EN ISO 11909: primary and secondary amines react with isocyanates to give substituted ureas. This reaction proceeds quantitatively in an excess of amine. At the end of the reaction the excess amine is subjected to potentiometric back-titration with hydrochloric acid.

Determination of Average Particle Size: Determination of average particle size: by means of laser diffraction of wet-dispersed powders according to ISO Standard ISO 13320: 2009.

CITED LITERATURE

WO 2015/197515 A1
U.S. Pat. No. 9,453,142
EP 0 089 180 A1
U.S. Pat. No. 4,434,126
"Kunststoffhandbuch", volume 7, "Polyurethane", Carl Hanser Verlag, 3rd edition, 1993, chapter 3.1
Kunststoffhandbuch, volume VII, edited by Vieweg and Höchtlen, Carl Hanser Verlag, Munich, 1966 (pp 103-113)
"Protective Groups in Organic Synthesis", John Wiley & Sons, Inc., 3rd edition, 1999, chapter 2.

The invention claimed is:
1. A method for producing a shaped body, the method comprising:
producing the shaped body from a composition by localized heating in a powder-based layer construction process,
wherein the composition comprises a thermoplastic polyurethane, obtained by a method comprising reacting at least one polyisocyanate composition and at least one polyol composition,
wherein the thermoplastic polyurethane is solid at least in a temperature region below 50° C. and has end groups selected from the group consisting of first end groups and second end groups, wherein the first end groups are optionally eliminated at a first temperature, and the second end groups are optionally eliminated at a second temperature, to form reactive groups on the thermoplastic polyurethane that optionally enter into a reaction with functional groups of the thermoplastic polyurethane or functional groups of a further component of the composition, and
wherein the first temperature and the second temperature are each greater than or equal to 60° C.

2. The method according to claim 1, wherein a total content of the first end groups and the second end groups is in a range from 0.01 to 50 mol% based on a content of urethane groups in the thermoplastic polyurethane.

3. The method according to claim 1, wherein the composition further comprises at least one chain extender selected from the group consisting of compounds having at least two groups that are reactive toward isocyanate groups.

4. The method according claim 1, wherein the at least one polyol composition comprises at least one chain extender selected from the group consisting of compounds having at least two groups that are reactive toward isocyanate groups.

5. The method according to claim 3, wherein the at least one chain extender is selected from the group consisting of a diamine and a diol, having a molecular weight of up to 500 g/mol.

6. The method according to claim 4, wherein the at least one chain extender is selected from the group consisting of a diamine and a diol, having a molecular weight of up to 500 g/mol.

7. The method according to claim 1, wherein the thermoplastic polyurethane has a molecular weight in a range from 2000 to 50 000 g/mol, determined by means of GPC.

8. The method according to claim 1, wherein the at least one polyisocyanate composition comprises at least one isocyanate selected from the group consisting of diphenylmethane 2,2'-, 2,4'- and/or 4,4'-diisocyanate, naphthylene 1,5-diisocyanate, tolylene 2,4- and/or 2,6-diisocyanate, 3,3'-dimethyl-4,4'-diisocyanatodiphenyl, p-phenylene diisocyanate, hexamethylene 1,6-diisocyanate, 1-isocyanato-3,3,5-trimethyl-5-isocyanatomethylcyclohexane and methylenedicyclohexyl 4,4'-, 2,4'- and/or 2,2'diisocyanate, and 1-isocyanato-3,3,5-trimethyl-5-isocyanatomethylcyclohexane and a derivative thereof.

9. The method according to claim 1, wherein the at least one polyol composition comprises a polyol selected from the group consisting of a polyether, a polyester, a polycaprolactone and a polycarbonate.

10. The method according to claim 1, wherein the thermoplastic polyurethane is present in a form of a powder with an average particle size d50 in a range of from 10 to 500 μm.

11. A method for producing a shaped body, the method comprising:
producing the shaped body from a composition by localized heating in a powder-based layer construction process, wherein a composition comprises a thermoplastic polyurethane obtained by a process comprising reacting at least one polyisocyanate composition and at least one polyol composition,
wherein the at least one polyisocyanate composition comprises an isocyanate having first end groups that are optionally eliminated at a first temperature to form reactive groups,
the at least one polyol composition comprises a polyol having end groups that are optionally eliminated at a second temperature to form reactive groups, or
the at least one polyisocyanate composition comprises an isocyanate having the first end groups and the polyol composition comprises a polyol having the second end groups that are both optionally eliminated at the first temperature and the second temperature and, respectively, to form reactive groups,
wherein the first temperature and the second temperature are each greater than or equal to 60° C., and
wherein the at least one polyisocyanate composition and the at least one polyol composition are reacted at a temperature that is lower than the first temperature and the second temperature.

12. The method according to claim 11, wherein the thermoplastic polyurethane is in a form of a powder having a median particle size d50 in a range from 10 to 500 μm.

* * * * *